US010831716B2

United States Patent
Liu et al.

(10) Patent No.: US 10,831,716 B2
(45) Date of Patent: *Nov. 10, 2020

(54) METHOD AND APPARATUS FOR CONFIGURING RELEVANT PARAMETERS OF MAPREDUCE APPLICATIONS

(71) Applicant: INTERNATIONAL BUSINESS MACHINES CORPORATION, Armonk, NY (US)

(72) Inventors: Jie Liu, Beijing (CN); Ju Wei Shi, Beijing (CN); Chen Wang, Beijing (CN); Yong Zheng, Beijing (CN); Jia Zou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/813,467

(22) Filed: Jul. 30, 2015

(65) Prior Publication Data

US 2016/0034482 A1 Feb. 4, 2016

(30) Foreign Application Priority Data

Jul. 31, 2014 (CN) .......................... 2014 1 0373376

(51) Int. Cl.
*G06F 16/182* (2019.01)
(52) U.S. Cl.
CPC .................................. *G06F 16/182* (2019.01)
(58) Field of Classification Search
None
See application file for complete search history.

(56) References Cited

U.S. PATENT DOCUMENTS 8,543,596 B1  9/2013  Kostamaa et al.
9,766,996 B1*  9/2017  Cao ...................... G06F 11/3447
(Continued)

FOREIGN PATENT DOCUMENTS

CN     103218263 A     7/2013
CN     103605662 A     2/2014

OTHER PUBLICATIONS

Hui Jin, Xi Yang, Xian-He Sun, Ioan Raicu, ADAPT: Availability-aware MapReduce Data Placement for Non-Dedicated Distributed Computing, ICDCS '12 Proceedings of the 2012 IEEE 32nd International Conference on Distributed Computing Systems, Jun. 18, 2012, pp. 516-525, IEEE Computer Society, Washington, DC, USA <http://ieeexplore.ieee.org/xpl/login.jsp?tp=&arnumber=6258024&url=http%3A%2F%2Fieeexplore.ieee.org%2Fiel5%2F6257102%2F6257972%2F06258024.pdf%3Farnumber%3D6258024/>.

(Continued)

*Primary Examiner* — Ashish Thomas
*Assistant Examiner* — Dustin D Eyers
(74) *Attorney, Agent, or Firm* — Cantor Colburn LLP; Joseph Petrokaitis (57) ABSTRACT

Method and apparatus for configuring relevant parameters of MapReduce applications. The method includes: receiving a request for processing a first MapReduce job; obtaining job feature attributes of historical MapReduce jobs; searching out a job feature attribute of a second MapReduce job associated with the first MapReduce job from within the job feature attributes of the historical MapReduce jobs; configuring relevant parameters of the first MapReduce job based on the job feature attribute of the second MapReduce job. According to this method of configuring parameters, network overheads of file transfer can be effectively reduced, the method of configuring parameters of the MapReduce job can be processed locally as much as possible, thereby (Continued)

effectively increasing system resource utilization while reducing the administrator's configuration burden. An apparatus for configuring relevant parameters of MapReduce application is also provided.

20 Claims, 3 Drawing Sheets

(56) References Cited

U.S. PATENT DOCUMENTS

| | | |
|---|---|---|
| 2010/0257198 A1* | 10/2010 | Cohen .............. G06F 17/30463 707/770 |
| 2011/0276789 A1* | 11/2011 | Chambers ............ G06F 9/3885 712/220 |
| 2012/0226639 A1 | 9/2012 | Burdick |
| 2012/0311581 A1 | 12/2012 | Balmin et al. |
| 2013/0191843 A1 | 7/2013 | Sarkar et al. |
| 2013/0204991 A1 | 8/2013 | Skjolsvold et al. |
| 2013/0290976 A1 | 10/2013 | Cherkasova et al. |
| 2013/0318525 A1 | 11/2013 | Palanisami et al. |
| 2014/0006448 A1* | 1/2014 | McCall ................ G06F 16/148 707/780 |
| 2014/0026147 A1* | 1/2014 | Cherkasova ............ G06F 9/505 718/105 |
| 2014/0033223 A1 | 1/2014 | Swart et al. |
| 2014/0136779 A1* | 5/2014 | Guha .................... G06F 9/5066 711/114 |

OTHER PUBLICATIONS

Bikash Sharma, Timothy Wood, Chita R. Das, HybridMR: A Hierarchiacal MapReduce Scheduler for Hybrid Data Centers, 2013 IEEE 33rd Internation Conference on Distrbuted Computing Systems, Jul. 8, 2013, pp. 102-111, IEEE Computer Society Washington, DC, USA <http://dl.acm.org/citation.cfm?id=2549723/>.

Jiong Xie, Shu Yin, Xiaojun Ruan, Zhiyang Ding, Yun Tian, James Majors, Adam Manzanares, Mao Qin, Improving MapReduce Performance through Data Placement in Heterogeneous Hadoop Clusters, Parallel & Distributed Processing, Workshops and Phd Forum (IPDPSW), 2010 IEEE International Symposium, Apr. 19, 2010, pp. 1-9, IEEE Computer Society Washington, DC, USA.

Balaji Palanisamy, Aameek Singh, Ling Liu, Bushan Jain, Purlieus: Locality-aware Resource Allocation for MapReduce in a Cloud, SC '11 Proceedings of 2011 International Conference for High Performance Computing, Networking, Storage and Analysis, Nov. 12, 2011, Article 58, Association for Computing Machinery, New York, NY, USA <http://dl.acm.org/citation.cfm?id=2063462/>.

* cited by examiner

METHOD AND APPARATUS FOR CONFIGURING RELEVANT PARAMETERS OF MAPREDUCE APPLICATIONS

CROSS REFERENCE

This application claims priority under 35 U.S.C. § 119 from Chinese Patent Application No. 201410373376.7 filed Jul. 31, 2014, the entire contents of which are incorporated herein by reference.

FIELD OF INVENTION

The present invention relates to a distributed file system. More specifically, the present invention provides a method and apparatus for configuring relevant parameters of a MapReduce application based on a distributed file system.

BACKGROUND

A distributed file system means physical storage resources managed by a file system are not necessarily connected to local nodes directly, but via a computer network. The distributed file system is designed based on a client/server mode. A typical network might include a plurality of servers available for multiple users to access. MapReduce is software architecture for large-scale parallel programming proposed by Google Corporation. As the MapReduce architecture can realize parallel operations of a large-scale data set (greater than 1 TB) and realize scalability by distributing large-scale operations on the data set to multiple nodes on the network for parallel operation, it is widely applied by the distributed file system. Concepts such as "Map," "Reduce," and their main thoughts are all borrowed from a functional programming language. Implementation of a current MapReduce middleware requires an application developer designate a Map function, for mapping a group of key-value pairs into some new key-value pairs (which are called the intermediate key-value pairs); besides, it also requires the application developer designate a Reduce function, for further processing the intermediate key-value pairs outputted by the Map function.

The distributed file system needs to store the divided file blocks on multiple computing nodes, and needs to copy each file block into multiple copies to be stored on different computing nodes. As a result, it is inevitable to incur network overheads for file transfer and localization needs of performing read/write operations on the data blocks of the local nodes as much as possible when performing read/write operations on file blocks of multiple computing nodes. For the existing distributed file systems, relevant parameters of the MapReduce job are all configured empirically by a system administrator. However, with the change of operations, data, and cluster characteristics, a set of universal manual configurations cannot optimize the system resource utilization.

Therefore, there is a need to effectively reduce network overheads of file transfer and realize configuration of relevant parameters of a MapReduce job for localization processing as much as possible, thereby reducing the administrator's configuration burden and effectively increasing system resource utilization.

SUMMARY

One aspect of the present invention, provides a method for configuring relevant parameters of a MapReduce application based on a distributed file system. The method includes: receiving a request for processing a first MapReduce job; obtaining job feature attributes of historical MapReduce jobs; searching out a job feature attribute of a second MapReduce job associated with the first MapReduce job from within the job feature attributes of the historical MapReduce jobs; and configuring relevant parameters of the first MapReduce job based on the job feature attribute of the second MapReduce job.

Another aspect of the present invention, provides an apparatus for configuring relevant parameters of a MapReduce application based on a distributed file system. The apparatus includes: a receiving module configured to receive a request for processing a first MapReduce job; a first obtaining module configured to obtain job feature attributes of historical MapReduce jobs; a first searching module configured to search out a job feature attribute of a second MapReduce job associated with the first MapReduce job from within the job feature attributes of the historical MapReduce jobs; and a first configuring module configured to configure relevant parameters of the first MapReduce job based on the job feature attribute of the second MapReduce job.

The method and apparatus for configuring relevant parameters of a MapReduce application according to the embodiments of the present invention can effectively reduce network overheads of file transfer and realize localization processing as much as possible, thereby effectively increasing system resource utilization while reducing the administrator's configuration burden.

BRIEF DESCRIPTION OF THE SEVERAL VIEWS OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and to completely convey the scope of the present invention to those skilled in the art.

Figure 1:
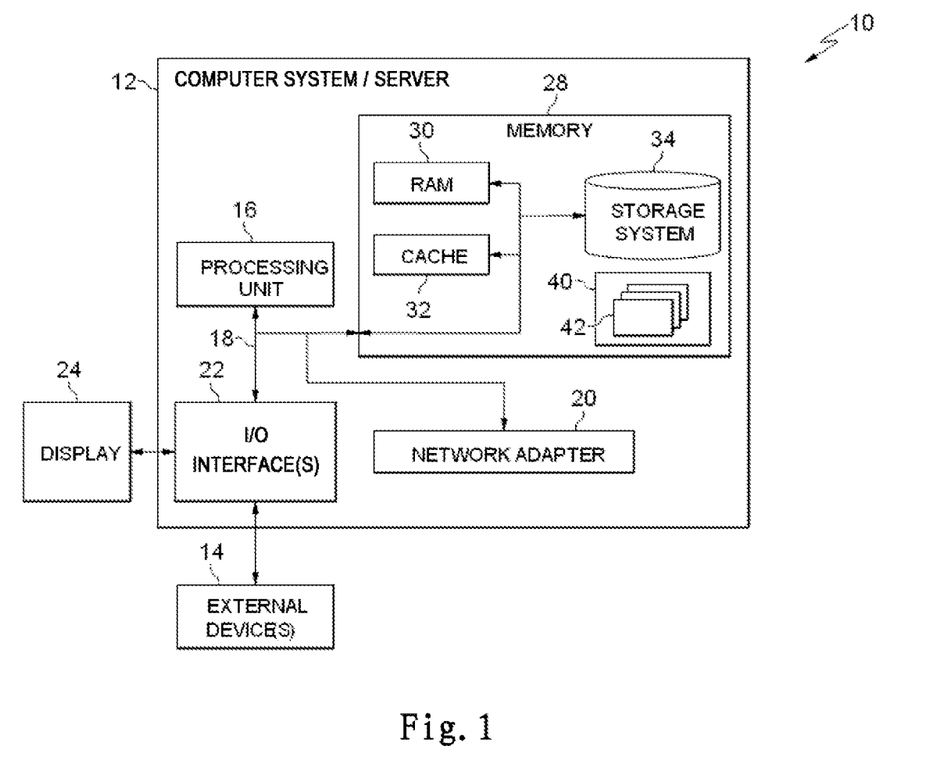
FIG. 1 shows an exemplary computer system/server which is applicable to implement the embodiments of the present invention.

Referring now to FIG. 1, exemplary computer system/server 12 is shown, which is applicable to implement the embodiments of the present invention. Computer system/ server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 can include, but are not limited to, one or more processors or processing units 16, system memory 28, and bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). A magnetic disk drive (not shown) can be provided for reading from and writing to a removable, non-volatile magnetic disk (e.g., a "floppy disk"). Also, an optical disk drive (not shown) can be provided for reading from or writing to a removable, non-volatile optical disk such as a CD-ROM, DVD-ROM or other optical media. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (e.g., at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. In addition, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
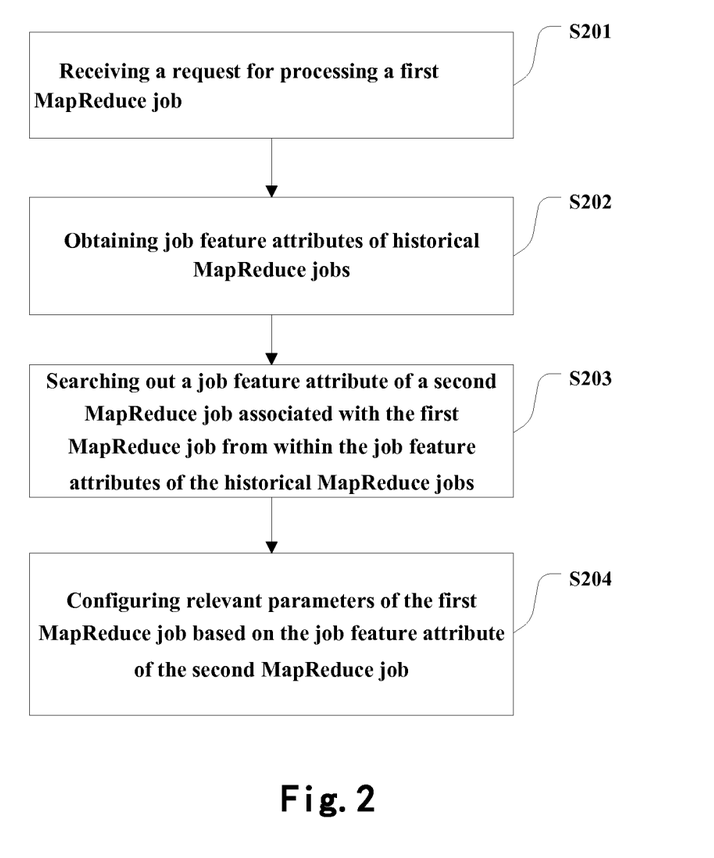
FIG. 2 shows a method for configuring relevant parameters of a MapReduce application based on a distributed file system according to the embodiments of the present invention.

Now, referring to FIG. 2, a method for configuring relevant parameters of a MapReduce application based on a distributed file system is presented. The method includes: step S201 of receiving a request for processing a first MapReduce job; step S202 of obtaining job feature attributes of historical MapReduce jobs; step S203 of searching out a job feature attribute of a second MapReduce job associated with the first MapReduce job from within the job feature attributes of the historical MapReduce jobs; and step S204 of configuring relevant parameters of the first MapReduce job based on the job feature attribute of the second MapReduce job.

In step S202, job feature attributes of historical MapReduce jobs are obtained, wherein the job feature attributes of the historical MapReduce jobs are extracted from within a log file of the historical MapReduce tasks. Specifically, the job feature attributes extracted from the log file of the historical MapReduce jobs include job names of the historical MapReduce jobs and at least one of the following: a path of an input file, a size of the input file, a path of an output file, a size of the output file, a number of Map tasks, and a number of Reduce tasks. The extracted job feature attributes can be stored according to a predefined data structure. According to the embodiments of the present invention, the job feature attributes of the historical MapReduce jobs are extracted from parameter sets of various MapReduce jobs that were previously tuned. Those skilled in the art understand that step S202 and step S201 can be performed simultaneously or sequentially, without sequence limitation in implementation.

In step S203, job feature attributes of a second MapReduce job associated with the first MapReduce job is searched out from within the job feature attributes of the historical MapReduce jobs.

According to the embodiments of the present invention, if the first MapReduce job is of a data generation type, searching out a second MapReduce job associated with the first MapReduce job from within the job feature attributes of the historical MapReduce jobs further includes: searching out a third MapReduce job similar to the first MapReduce job from within the job feature attributes of the historical MapReduce jobs; and searching out a second MapReduce job with an output file of the third MapReduce job as an input file from within the job feature attributes of the historical MapReduce jobs. Here, the MapReduce job of a data generation type means that the output data of the MapReduce job after being subject to MapReduce processing is taken as input data of other MapReduce jobs (e.g., a TeraGen job).

According to the embodiments of the present invention, searching out a third MapReduce job similar to the first MapReduce job from within the job feature attributes of the historical MapReduce jobs includes: searching in the job feature attributes of the historical MapReduce jobs with a job name of the first MapReduce job as a keyword; determining, in response to searching out a historical MapReduce job having a same job name as the first MapReduce job, the historical MapReduce job as the third MapReduce job; and determining, in response to searching out multiple historical MapReduce jobs having a same job name, a third MapReduce job similar to the first MapReduce job based on at least one of the followings: a path of an output file, a size of the output file, and a number of the computing nodes. For example, a weight can be assigned to the path of the output file, the size of the output file, and the number of computing nodes, respectively, thereby a third MapReduce job similar to the first MapReduce job is determined.

According to a further embodiment of the present invention, if the first MapReduce job is of a data consumption type, searching out a second MapReduce job associated with the first MapReduce job from within the job feature attributes of the historical MapReduce jobs further includes: searching out a second MapReduce job similar to the first MapReduce job from within the job feature attributes of the historical MapReduce jobs. The MapReduce job of the data consumption type means the data generated by the MapReduce job in reading other MapReduce jobs, and the data generated by the MapReduce job will not be processed by other MapReduce jobs (e.g., TeraSort job).

Herein, searching out a second MapReduce job similar to the first MapReduce job from within the job feature attributes of the historical MapReduce jobs further includes: searching in job feature attributes of the historical MapReduce jobs with the job name of the first MapReduce job as a keyword; determining, in response to searching out a historical MapReduce job having a same job name as the first MapReduce job, the historical MapReduce job as the second MapReduce job; and determining, in response to searching out multiple historical MapReduce jobs having a same job name, a second MapReduce job similar to the first MapReduce job based on at least one of the followings: a path of an input file, a size of an output file, and a number of the computing nodes. For example, a weight can be assigned to the path of the input file, the size of the output file, and the number of computing nodes, respectively, thereby a second MapReduce job similar to the first MapReduce job is determined.

In step S204, relevant parameters of the first MapReduce job are configured based on the job feature attribute of the second MapReduce job. According to the embodiments of the present invention, relevant parameters of the first MapReduce job include: a block size of the input file of the first MapReduce job, and at least one of the number of Map tasks and the number of Reduce tasks of the first MapReduce job.

According to the embodiments of the present invention, if the first MapReduce job is of a data generation type, the block size of the input file of the first MapReduce job is partitioned based on the slice size of the input file of the second MapReduce job. The block size of the input file of the first MapReduce job is configured to be an integer multiple of the slice size of the input data of the second MapReduce job. For example, if the slice of the input data of the MapReduce job A is 210 MB, the data block size of the input file of the MapReduce job A should be an integer multiple of 210 MB (i.e., 210 MB, 420 MB, 630 MB, etc.). The distributed file system partitions a file deposited on the file system into a plurality of data block files, each of the data block files being placed on a computing node. During the processing procedure of the MapReduce job, the data are read by the Map task server according to the data slice size. If the data block size is an integer multiple of the data slice size, cross-node data reading will not occur, while the network overheads will be reduced, and the job performance will be enhanced. Usually, a user can designate one of the number of Map tasks and the input data slice size. The data block size of the input file of a new job is configured with reference to the input data slice size of historical job, such that a better performance than the default data block size of the input file in the system can be achieved.

According to the embodiments of the present invention, configuring relevant parameters of the first MapReduce job based on the job feature attribute of the second MapReduce job further includes: determining at least one of a number of Map tasks and a number of Reduce Tasks based on a slice size of the input file of the second MapReduce job.

Currently, most MapReduce resource schedulers schedule according to the specific number of resource slots. For example, in Hadoop, there are two kinds of resource slots: Map resource slots and Reduce resource slots. Each node can configure the number of resource slots based on its own resource condition. Therefore, considering the number of CPUs, the number of CPUs can act as the number of resource slots. Once the configuration is done, Hadoop is started and cannot be modified. If an idle resource slot appears on a certain node, the resource scheduler will assign a task to the computing node. The resource slot is similar to a token. A Map task needs to get a Map resource slot before running. Likewise, a Reduce task needs to get a Reduce resource slot before running. If all of the current resource slots are occupied by tasks, the remaining tasks need to queue.

According to the embodiments of the present invention, determining a number of Map tasks or a number of Reduce tasks of the first MapReduce job based on the slice size of the input file of the second MapReduce job further includes: obtaining a number of computing nodes which process the first MapReduce job and a number of resource slots corresponding to each computing node; configuring the number of Map tasks or the number of Reduce tasks of the first MapReduce job to be an integer multiple of a total number of resource slots of all computing nodes. Configuring the number of Map tasks or the number of Reduce tasks based on parameters (e.g., slice size) of similar historical jobs can utilize the processing capability of the resource slots of each computing node to the utmost extent, reduce task waiting and idle resource slots of the nodes, and achieve a performance better than the default configuration.

According to the embodiments of the present invention, if the first MapReduce job is of a data generation type, the number of Map tasks of the first MapReduce job can also be determined based on the number of Map tasks of the third MapReduce job similar to the first MapReduce job. Specifically, the number of Map tasks of the third MapReduce job is configured as the number of Map tasks of the first MapReduce job when the following two conditions are satisfied: 1) the number of Map tasks of a third historical MapReduce job is an integer multiple of the total number of the resource slots of all computing nodes; and 2) the data block size of the input file of the first MapReduce job is an integer multiple of the input data slice size calculated based on the number of Map tasks of the third MapReduce job. If the above two conditions are not satisfied, then a numerical value around the number of Map tasks of the third historical MapReduce job is selected as the number of Map tasks of the first MapReduce job, which numerical value satisfies the following two conditions: 1) the numeral value is an integer multiple of the total number of the resource slots of all computing nodes; 2) the data block size of the input file of the first MapReduce job is an integer multiple of the input data slice size calculated based on the numerical value. Further, if a numerical value satisfying both of the above two conditions is unavailable, a numerical value satisfying condition 1) is selected in preference.

According to the embodiments of the present invention, if the first MapReduce job is of a data consumption type, the number of Map tasks or the number of Reduce tasks of the first MapReduce job can also be determined based on the number of Map tasks or the number of Reduce tasks of a second MapReduce job that is similar to the first MapReduce job. Specifically, the number of Map tasks or the number of Reduce tasks of the second MapReduce job is configured as the number of Map tasks or the number of Reduce tasks of the first MapReduce job if the following condition is satisfied: the number of Map tasks or the number of Reduce tasks of the second MapReduce job is an integer multiple of a total number of resource slots of all computing nodes. If the number of the Map tasks or the number of Reduce tasks of the second MapReduce job is not an integer multiple of the total number of the resource slots of all computing nodes, then two scenarios should be considered. First, if the number of the Map tasks or the number of Reduce tasks of the second MapReduce job is far greater than the total number of the resource slots of all computing nodes (e.g., the number of Map tasks or the number of Reduce tasks is 10 or more times of the total number of the resource slots of all computing nodes). In this case, the number of the Map tasks or the number of Reduce tasks of the second MapReduce job is configured as the number of Map tasks or the number of Reduce tasks of the first MapReduce configuration. Second, if the number of the Map tasks or the number of the Reduce tasks of the second MapReduce job is far less than the total number of the resource slots of all computing nodes (e.g., the total number of the resource slots of all computing nodes is 10 or less times of the number of Map tasks or the number of Reduce tasks), then the number of the Map tasks or the number of Reduce tasks of the first MapReduce job is configured as the total number of the resource slots of all computing nodes.

According to one embodiment of the present invention, table 1 shows a list of historical task feature attributes composed of task feature attributes extracted from a log file of historical MapReduce jobs.

TABLE 2

Configuration Parameters of the TeraGen job

| Job name | Input file path | Input file size | Output file path | Output file size |
|---|---|---|---|---|
| TeraGen | NULL | NULL | Temp/TS-Input1 | 1 TB |

With TeraGen as the key word, a search is performed in the list of historical task feature attributes in above Table 1, and two TeraGen historical jobs, 3 and 4, are searched out. It is further determined that historical job 4 is a historical job similar to the to-be-processed TeraGen job based on the path of the output file and the size of the output file, and job 5 TeraSort is searched out whose input file is the output file of the historical job 4. The data block size of the to-be-processed TeraGen job is determined based on the slice size of the input data of the historical job 5. Specifically, the slice size of the input data of the historical job 5 is 1 TB/16=64 MB. Therefore, the slice size of the input data of the to-be-processed TeraGen job is configured to 64 MB, and the data block size of the input file is configured to be an integer multiple of 64 MB (e.g., 64 MB, 128 MB, etc.).

The number of Map tasks of the to-be-processed TeraGen job is further determined. It is not necessary to configure the number of Reduce tasks since the TeraGen job is not subject to the Reduce processing. Suppose the cluster has three nodes, based on the resources of the cluster, the number of the resource slots is determined to be 8. The number of the resource slots of computing node 1 is 3, the number of the resource slots of computing node 2 is 3, and the number of the resource slots of computing node 3 is 2. A configuration file of each computing node is modified based on the number of resource slots of each node. Therefore, it is necessary to configure the number of Map tasks to be an integer multiple of 8. Based on the slice size 64 MB of the input data, it is further obtained that the number of Map tasks of the to-be-processed TeraGen job is 1 TB/64 M=16384. Since 16384 is an integer multiple of 8, 16384 is selected as the number of Map tasks.

TABLE 1

List of Historical Task Feature Attributes

| No. | Job Name | Input file path | Input file size | Output file path | Output file size | Number of Map tasks | Number of Reduce tasks |
|---|---|---|---|---|---|---|---|
| 1 | Word count | Hdfs://xrime-test-001:54310/user | 100 GB | /user/biadmin/zxntest/output5 | 1 TB | 24 | 6 |
| 2 | Word count | Hdfs://xrime-test-001:54310/user | 100 GB | /user/biadmin/zxntest/output4 | 1 TB | 48 | 8 |
| 3 | Tera Gen | NULL | NULL | Temp/TS-InputA | 1 TB | 240 | 0 |
| 4 | Tera Gen | NULL | NULL | Temp/TS-Input1 | 1 TB | 240 | 0 |
| 5 | Tera Sort | Temp/TS-Input1 | 1 TB | Temp/TS-Output3 | 1 TB | 16 | 240 |
| 6 | Tera Sort | Temp/TS-Input2 | 2 TB | Temp/TS-Output2 | 2 TB | 8192 | 240 |

The user submits a MapReduce job of the data generation type; the name of the job is TeraGen. Table 2 shows configuration parameters of the TeraGen job submitted by the user, wherein the data block size of the file generated by the system in default is 128 M.

According to another embodiment of the present invention, the user submits a MapReduce job of a data consumption type, the job name being TeraSort. Table 3 shows the configuration parameters of the TeraSort job submitted by the user.

TABLE 3

Configuration Parameters of the TeraSort Job

| Job Name | Input file path | Output file path | Output file size |
|---|---|---|---|
| TeraSort | Temp/TS-Input2 | Temp/TS-Output5 | 3 TB |

With TeraSort as the key word, a search is performed in the above list of historical task feature attributes. Two TeraSort historical jobs 5 and 6 are searched out. Based on the path of the input file and the size of the output file, it is further determined that historical job 6 is a historical job similar to the to-be-processed TeraSort job. Based on the slice size of the input data of the historical job 6, the number of the Map tasks of the to-be-processed TeraSort job is determined. Specifically, the slice size of the input data of the job 6 is 2 TB/8192.256 MB; therefore, the slice size of the input data of the to-be-processed TeraSort job is determined to 256 MB. It is further obtained that the number of Map tasks of the to-be-processed TeraSort job is 3 TB/256 M=12288. Since the number of Reduce tasks is not affected by the slice size of the input data, the number of the Reduce tasks is configured to be 240, the number of Reduce tasks of the job 6. Suppose the cluster has three nodes, based on the resources of the cluster, the number of resource slots is determined to be 6. The number of the resource slots of the computing node 1 is 3, the number of the resource slots of computing node 2 is 2, and the number of resource slots of computing node 3 is 1. The number of resource slots of each node is written into the configuration file of each computing node. It is required to configure the number of the Map tasks or the number of Reduce tasks as an integer multiple of 6; the number of Reduce tasks, i.e., 240, meets the requirements, and the number of Map tasks, i.e., 12288, also meets the requirements.

Various embodiments of implementing the method of the present invention have been described above with reference to the accompanying drawings. Those skilled in the art should understand that the above method can be implemented in a software manner, or in a hardware manner, or implemented through a combination of software and hardware. Moreover, those skilled in the art can understand, by implementing respective steps in the method in software, hardware or a combination of software and hardware, an apparatus for configuring relevant parameters of a MapReduce application based on a distributed file system can be provided. Even the apparatus is identical to a general processing device in terms of structure, due to the function of the software included therein, the apparatus is made to exhibit characteristics distinct from the general processing device, thereby forming an apparatus for various embodiments of the present invention.

Figure 3:
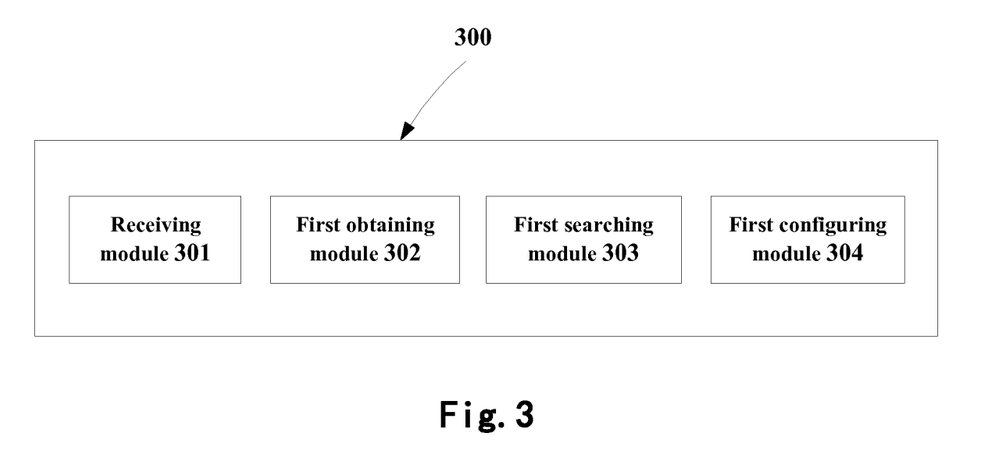
FIG. 3 shows an apparatus for configuring relevant parameters of a MapReduce application based on a distributed file system according to the embodiments of the present invention.

Based on the same inventive concept, embodiments of the present invention further provide an apparatus for configuring relevant parameters of a MapReduce application based on a distributed file system. FIG. 3 shows an apparatus 300 for configuring relevant parameters of a MapReduce application based on a distributed file system according to the embodiments of the present invention. The apparatus includes: a receiving module 301 configured to receive a request for processing a first MapReduce job; a first obtaining module 302 configured to obtain a job feature attribute of historical MapReduce jobs; a first searching module 303 configured to search out a job feature attribute of a second MapReduce job associated with the first MapReduce job from within the job feature attributes of the historical MapReduce jobs; and a first configuring module 304 configured to configure relevant parameters of the first MapReduce job based on the job feature attribute of the second MapReduce job, wherein the job feature attributes of the historical MapReduce jobs include job names of the historical MapReduce jobs and at least one of the followings: a path of an input file, a size of the input file, a path of an output file, a size of the output file, number of Map tasks, and a number of Reduce tasks.

According to the embodiments of the present invention, if the first MapReduce job is of a data generation type, the first searching module further includes: a second searching module configured to search out a third MapReduce job similar to the first MapReduce job from the job feature attributes of the historical MapReduce jobs; and a third searching module configured to search out a second MapReduce job with an output file of the third MapReduce job as an input file from within the job feature attributes of the historical MapReduce jobs.

According to the embodiments of the present invention, the first configuration module 304 further includes: a partitioning module configured to partition a data block size of the input file of the first MapReduce job based on a slice size of the input file of the second MapReduce job.

According to the embodiments of the present invention, the partitioning module is further configured to configure the block size of the input file of the first MapReduce job to be an integer multiple of the slice size of the input data of the second MapReduce job.

According to the embodiments of the present invention, if the first MapReduce job is of a data consumption type, the first searching module further includes: a fourth searching module configured to search out a second MapReduce job similar to the first MapReduce job from within the job feature attributes of the historical MapReduce jobs.

According to the embodiments of the present invention, the first configuring module further includes: a first determining module configured to determine a number of Map tasks or a number of Reduce tasks of the first MapReduce job based on the slice size of the input file of the second MapReduce job.

According to the embodiments of the present invention, the first determining module further includes: a second obtaining module configured to obtain a number of computing nodes which process the first MapReduce job and a number of resource slots corresponding to each computing node; and a second configuring module configured to configure the number of Map tasks or the number of Reduce tasks of the first MapReduce job to be an integer multiple of a total number of resource slots of all computing nodes.

According to the embodiments of the present invention, the second searching module includes: a fifth searching module configured to search in the job feature attributes of the historical MapReduce jobs with a job name of the first MapReduce job as a keyword; a second determining module configured to determine, in response to searching out a historical MapReduce job having a same job name as the first MapReduce job, the historical MapReduce job as the third MapReduce job; and a third determining module configured to, in response to searching out multiple historical MapReduce jobs having a same job name, determine a third MapReduce job similar to the first MapReduce job based on at least one of the followings: a path of an output file, a size of the output file, and a number of the computing nodes.

According to the embodiments of the present invention, the fourth searching module includes: a fifth searching module configured to search in the job feature attributes of the historical MapReduce jobs with the job name of the first MapReduce job as a keyword; a fourth determining module configured to determine, in response to searching out a historical MapReduce job having a same job name as the first MapReduce job, the historical MapReduce job as the second MapReduce job; and a fifth determining module configured to determine, in response to searching out multiple historical MapReduce jobs having a same job name, a second MapReduce job similar to the first MapReduce job based on at least one of the followings: a path of an input file, a size of an output file, and a number of the computing nodes.

According to the embodiments of the present invention, there further includes: a sixth determining module configured to determine a number of Map tasks of the first MapReduce job based on a number of Map tasks of the third MapReduce job.

According to the embodiments of the present invention, there further includes: a seventh determining module configured to determine at least one of a number of Map tasks and a number of Reduce tasks of the first MapReduce job based on a number of Map tasks or a number of Reduce tasks of the second MapReduce job.

The specific implementation method of each module above refers to the detailed description in the method for configuring relevant parameters of a MapReduce application based on a distributed file system according to the embodiments of the present invention.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for configuring relevant parameters of a MapReduce application based on a distributed file system, comprising:
   receiving, by a processor, a request for processing a first MapReduce job;
   obtaining, by the processor, job feature attributes of historical MapReduce jobs, wherein the job feature attributes of the historical MapReduce jobs include a number of Map tasks and a number of Reduce tasks; and
      wherein the job feature attributes of the historical MapReduce jobs include job names of the historical MapReduce jobs, a path of the input file, and at least one of the following: a size of the input file, a path of an output file, a number of computing nodes, and a size of the output file;
   searching out, by the processor, a job feature attribute of a second MapReduce job associated with the first MapReduce job from within the job feature attributes of the historical MapReduce jobs, wherein searching out the job feature attribute of the second MapReduce job comprises:
      assigning a weight to the path of the input file for the historical MapReduce jobs; and
      determining the second MapReduce job based at least in part on the weight assigned to the path of the input file for the historical MapReduce jobs;
   configuring, by the processor, relevant parameters of the first MapReduce job based on the job feature attribute of the second MapReduce job;
   based at least in part on a determination that the first MapReduce job is of a data generation type, searching out, by the processor, a third MapReduce job similar to the first MapReduce job from within the job feature attributes of the historical MapReduce jobs;
   determining a third number of Map tasks for the third MapReduce Job is configured as a first number of Map tasks of the first MapReduce job based on:
      the third number of Map tasks of the third MapReduce job being an integer multiple of a total number of resource slots of the computing nodes; and
      a data block size of an input file of the first MapReduce job being an integer multiple of an input data slice calculated based on the third number of Map tasks of the third Map Reduce job;
   determining the third number of Map tasks for the third MapReduce Job is configured as a fourth number around the first number of Map tasks of the first MapReduce job, wherein the fourth number is a numerical value comprising an integer multiple of a total number of resource slots of all computing nodes; and wherein a data block size of the input file of the first MapReduce job is an integer multiple of the input data slice size calculated based on the numerical value; and
   searching out, by the processor, the second MapReduce job with an output file of the third MapReduce job as an input file from within the job feature attributes of the historical MapReduce jobs.

2. The method of claim 1, further comprising:
   searching out the second MapReduce Job associated with the first MapReduce job from within the job feature attributes of the historical MapReduce jobs based at least in part on a determination that the first MapReduce job is of a data consumption type.

3. The method according to claim 1, wherein configuring relevant parameters of the first MapReduce job based on the job feature attribute of the second MapReduce job further comprises:
   partitioning a data block size of the input file of the first MapReduce job based on a slice size of the input file of the second MapReduce job.

4. The method according to claim 3, wherein partitioning the data block size of the input file of the first MapReduce job based on a slice size of the input file of the second MapReduce job comprises:
   configuring the data block size of the input file of the first MapReduce job to be an integer multiple of the slice size of the input data of the second MapReduce job.

5. The method according to claim 4, wherein configuring relevant parameters of the first MapReduce job based on the job feature attribute of the second MapReduce job further comprises:
   determining a number of Map tasks or a number of Reduce tasks of the first MapReduce job based on the slice size of the input file of the second MapReduce job.

6. The method according to claim 5, wherein determining the number of Map tasks or the number of Reduce tasks of the first MapReduce job based on the slice size of the input file of the second MapReduce job further comprises:
   obtaining a number of computing nodes which process the first MapReduce job and a number of resource slots corresponding to each computing node; and
   configuring the number of Map tasks or the number of Reduce tasks of the first MapReduce job to be an integer multiple of a total number of resource slots of all computing nodes.

7. The method according to claim 1, wherein searching out the third MapReduce job similar to the first MapReduce job from the job feature attributes of the historical MapReduce jobs comprises:
   searching in the job feature attributes of the historical MapReduce jobs with a job name of the first MapReduce job as a keyword;
   determining, in response to searching out a historical MapReduce job having the same job name as the first MapReduce job, the historical MapReduce job as the third MapReduce job; and
   determining, in response to searching out multiple historical MapReduce jobs having the same job name, the third MapReduce job similar to the first MapReduce job based on at least one of the following: a path of an output file, a size of the output file, and a number of the computing nodes.

8. The method according to claim 2, wherein searching out the second MapReduce job similar to the first MapReduce job from within the job feature attributes of the historical MapReduce jobs further comprises:
   searching in the job feature attributes of the historical MapReduce jobs with the job name of the first MapReduce job as a keyword;
   determining, in response to searching out the historical MapReduce job having a same job name as the first MapReduce job, the historical MapReduce job as the second MapReduce job; and
   determining, in response to searching out multiple historical MapReduce jobs having a same job name, the second MapReduce job similar to the first MapReduce job based on at least one of the followings: a path of an input file, a size of an output file, and a number of the computing nodes.

9. The method according to claim 1, further comprising:
   determining a number of Map tasks of the first MapReduce job based on a number of Map tasks of the third MapReduce job.

10. The method according to claim 2, further comprising:
    determining a number of Map tasks or a number of Reduce tasks of the first MapReduce job based on a number of Map tasks or a number of Reduce tasks of the second MapReduce job.

11. An apparatus for configuring relevant parameters of a MapReduce application based on a distributed file system, comprising:
    a processor communicatively coupled to a memory, the processor configured to:
    receive a request for processing a first MapReduce job;
    obtain a job feature attribute of historical MapReduce jobs, wherein the job feature attributes of the historical MapReduce jobs are obtained from a log file of the historical MapReduce jobs,
    wherein the job feature attributes of the historical MapReduce jobs include a number of Map tasks and a number of Reduce tasks; and
    wherein the job feature attributes of the historical MapReduce jobs include job names of the historical MapReduce jobs, a path of the input file, and at least one of the following: a size of the input file, a path of an output file, a number of computing nodes, and a size of the output file;
    search out a job feature attribute of a second MapReduce job associated with the first MapReduce job from within the job feature attributes of the historical MapReduce jobs, wherein searching out the job feature attribute of the second MapReduce job comprises:
      assigning a weight to the path of the input file for the historical MapReduce jobs; and
      determining the second MapReduce job based at least in part on the weight assigned to the path of the input file for the historical MapReduce jobs;
    configure relevant parameters of the first MapReduce job based on the job feature attribute of the second MapReduce job;
    based at least in part on a determination that the first MapReduce job is of a data generation type, search out a third MapReduce job similar to the first MapReduce job from within the job feature attributes of the historical MapReduce jobs;
    determining a third number of Map tasks for the third MapReduce Job is configured as a first number of Map tasks of the first MapReduce job based on:
      the third number of Map tasks of the third MapReduce job being an integer multiple of a total number of resource slots of the computing nodes; and
      a data block size of an input file of the first MapReduce job being an integer multiple of an input data slice calculated based on the third number of Map tasks of the third Map Reduce job;
    determining the third number of Map tasks for the third MapReduce Job is configured as a fourth number around the first number of Map tasks of the first MapReduce job, wherein the fourth number is a numerical value comprising an integer multiple of a total number of resource slots of all computing nodes; and wherein a data block size of the input file of the first MapReduce job is an integer multiple of the input data slice size calculated based on the numerical value; and
    search out the second MapReduce job with an output file of the third MapReduce job as an input file from within the job feature attributes of the historical MapReduce jobs.

12. The apparatus of claim 11, wherein based on a determination that the first MapReduce job is of a data consumption type, the processor is further configured to:
    search out the second MapReduce job similar to the first MapReduce job from within the job feature attributes of the historical MapReduce jobs.

13. The apparatus according to claim 11, wherein the processor is further configured to:
    partition a data block size of the input file of the first MapReduce job based on a slice size of the input file of the second MapReduce job.

14. The apparatus according to claim 13, wherein the processor is further configured to configure the data block size of the input file of the first MapReduce job to be an integer multiple of the slice size of the input data of the second MapReduce job.

15. The apparatus according to claim 14, wherein the processor is further configured to:
    determine at least one of a number of Map tasks and a number of Reduce tasks of the first MapReduce job based on the slice size of the input file of the second MapReduce job.

16. The apparatus according to claim 15, wherein the processor is further configured to:
    obtain a number of computing nodes which process the first MapReduce job and a number of resource slots corresponding to each computing node; and
    configure the number of Map tasks or the number of Reduce tasks of the first MapReduce job to be an integer multiple of a total number of resource slots of all computing nodes.

17. The apparatus according to claim 11, wherein the processor is further configured to:
- search in the job feature attributes of the historical MapReduce jobs with a job name of the first MapReduce job as a keyword;
- determine, in response to searching out a historical MapReduce job having a same job name as the first MapReduce job, the historical MapReduce job as the third MapReduce job; and
- in response to searching out multiple historical MapReduce jobs having a same job name, determine the third MapReduce job similar to the first MapReduce job based on at least one of the followings: a path of an output file, a size of the output file, and a number of the computing nodes.

18. The apparatus according to claim 12, wherein the processor is further configured to:
- search in the job feature attributes of the historical MapReduce jobs with the job name of the first MapReduce job as a keyword;
- determine, in response to searching out a historical MapReduce job having a same job name as the first MapReduce job, the historical MapReduce job as the second MapReduce job; and
- determine, in response to searching out multiple historical MapReduce jobs having a same job name, the second MapReduce job similar to the first MapReduce job based on at least one of the followings: a path of an input file, a size of an output file, and a number of the computing nodes.

19. The apparatus according to claim 11, wherein the processor is further configured to:
- determine a number of Map tasks of the first MapReduce job based on a number of Map tasks of the third MapReduce job.

20. The apparatus according to claim 12, wherein the processor is further configured to:
- determine at least one of a number of Map tasks and a number of Reduce tasks of the first MapReduce job based on a number of Map tasks or a number of Reduce tasks of the second MapReduce job.

* * * * *